United States Patent
Stanka et al.

(10) Patent No.: US 9,771,827 B2
(45) Date of Patent: Sep. 26, 2017

(54) DAMPING DEVICE FOR BEING SITUATED BETWEEN A HOUSING WALL AND A CASING RING OF A HOUSING OF A THERMAL GAS TURBINE

(71) Applicant: MTU Aero Engines AG, Munich (DE)

(72) Inventors: Rudolf Stanka, Rattenkirchen (DE); Thomas Hess, Munich (DE); Karl Maar, Pfaffenhofen an der Ilm (DE); Karl-Heinz Dusel, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 441 days.

(21) Appl. No.: 14/337,960

(22) Filed: Jul. 22, 2014

(65) Prior Publication Data
US 2015/0030434 A1    Jan. 29, 2015

(30) Foreign Application Priority Data
Jul. 23, 2013 (EP) .................................. 13177520

(51) Int. Cl.
| | |
|---|---|
| *F01D 25/04* | (2006.01) |
| *B28B 1/00* | (2006.01) |
| *F02C 7/24* | (2006.01) |
| *F01D 25/14* | (2006.01) |
| *F01D 11/18* | (2006.01) |
| *F01D 11/12* | (2006.01) |

(52) U.S. Cl.
CPC ............. *F01D 25/04* (2013.01); *B28B 1/001* (2013.01); *F01D 25/145* (2013.01); *F02C 7/24* (2013.01);
(Continued)

(58) Field of Classification Search
CPC ......... B28B 1/001; F01D 25/04; F01D 25/14; F01D 25/145; F05D 2240/15;
(Continued)

(56) References Cited

U.S. PATENT DOCUMENTS

| 4,300,349 A | * | 11/1981 | Heckel | ..................... F02C 7/24 |
| | | | | 415/197 |
| 4,526,616 A | | 7/1985 | Fennell et al. | |
| 5,174,714 A | * | 12/1992 | Plemmons | ............ F01D 25/145 |
| | | | | 29/888.01 |
| 5,662,457 A | * | 9/1997 | Bechtel | ................. F01D 25/145 |
| | | | | 29/889.2 |
| 8,336,316 B2 | * | 12/2012 | Kirby | .................... F01D 17/105 |
| | | | | 60/725 |

(Continued)

FOREIGN PATENT DOCUMENTS

| DE | 28 42 410 | 4/1980 | |
| DE | 34 46 649 | 6/1986 | |
| DE | 43 31 060 | 6/1994 | |
| DE | 694 08 423 | 7/1998 | |
| FR | 1 235 694 | 7/1960 | |
| FR | 2957115 A1 | * 9/2011 | ............. F01D 9/042 |

OTHER PUBLICATIONS

English translation of FR 2957115.*

*Primary Examiner* — Woody Lee, Jr.
*Assistant Examiner* — Topaz L Elliott
(74) *Attorney, Agent, or Firm* — Davidson, Davidson & Kappel, LLC

(57) ABSTRACT

A damping device for being situated between a housing wall of a housing of a thermal gas turbine and a casing ring is provided. The casing ring includes an area radially internal with regard to a rotation axis of a rotor of the thermal gas turbine and facing rotating moving blades of the gas turbine. The damping device includes at least sectionally a porous damping structure. A method for manufacturing this type of damping device as well as to a thermal gas turbine, in particular an aircraft engine, in which this type of damping device is situated in a housing of the gas turbine between a housing wall and a casing ring are also provided.

16 Claims, 3 Drawing Sheets

(52) U.S. Cl.
CPC ............ *F01D 11/127* (2013.01); *F01D 11/18* (2013.01); *F05D 2230/20* (2013.01); *F05D 2230/22* (2013.01); *F05D 2240/11* (2013.01); *F05D 2250/11* (2013.01); *F05D 2250/12* (2013.01); *F05D 2250/13* (2013.01); *F05D 2250/18* (2013.01); *F05D 2260/941* (2013.01); *F05D 2300/501* (2013.01); *F05D 2300/514* (2013.01); *Y02T 50/672* (2013.01); *Y02T 50/675* (2013.01)

(58) Field of Classification Search
CPC ......... F05D 2300/501; F05D 2300/514; F05D 2260/96; F05D 2260/231; F05D 2260/941; F02C 7/24
See application file for complete search history.

(56) References Cited

U.S. PATENT DOCUMENTS

| | | | | |
|---|---|---|---|---|
| 2010/0115964 | A1* | 5/2010 | Kirby | F01D 17/105 60/785 |
| 2011/0206502 | A1* | 8/2011 | Rulli | F01D 11/24 415/177 |
| 2014/0099476 | A1* | 4/2014 | Subramanian | B22F 5/009 428/164 |
| 2015/0003964 | A1* | 1/2015 | Granberg | F01D 9/041 415/115 |

* cited by examiner

DAMPING DEVICE FOR BEING SITUATED BETWEEN A HOUSING WALL AND A CASING RING OF A HOUSING OF A THERMAL GAS TURBINE

This claims the benefit of European Patent Application EP 13177520.7, filed Jul. 23, 2013 and hereby incorporated by reference herein.

The present invention relates to a damping device for being situated between a housing wall of a housing of a thermal gas turbine and a casing ring. The present invention furthermore relates to a method for manufacturing this type of damping device as well as to a thermal gas turbine having this type of damping device.

BACKGROUND

Damping devices which are situated between a housing wall and a casing ring or casing ring segment of thermal gas turbines for the purpose of reducing a heat input into the housing wall during operation of the associated gas turbine are present in environments having high temperature gradients. These components are therefore designed in such a way that the deformation which is generated by the temperature gradient does not or essentially does not impair the damping function.

A damping device is known from DE 43 31 060 C1 which includes two metal foils which are connected to one another by crimping over their edge areas and which include a heat insulating material. The heat insulating material is, for example, a compact composite material mixture of a not-expanded aluminum silicate/ceramic fiber/vermiculite and an organic binder. Rising temperatures result in an expansion of the heat insulating material so that the damping device is pressed against the walls which delimit the hollow space, thus additionally sealing the latter. The crimping over of the metal foils may result in them shifting against one another during the volume increase in the heat insulating material.

The circumstance to be considered as disadvantageous in the case of the known damping device is that the metal foils which are to be provided to be relatively thin are susceptible to cracking, in particular in the transition area to their crimping lines, as well as on their radial bottom side which faces the hot gas of the gas turbine.

The heat insulating material is lost over time due to the resulting cracks, whereby both the damping and the sealing effects are impaired.

SUMMARY OF THE INVENTION

It is an object of the present invention to provide a damping device of the type mentioned at the outset which has a reliable damping effect even in the case of high temperature gradients. Further objects of the present invention are the provision of a method for manufacturing this type of a damping device as well as the design of a thermal gas turbine having this type of a damping device.

The present invention provides a damping device for being situated between a housing wall of a housing of a thermal gas turbine and a casing ring which has an area which is radially internal with regard to a rotation axis of a rotor of the thermal gas turbine and which faces the rotating moving blades of the gas turbine. According to the present invention, a reliable damping effect is achieved even in the case of high temperature gradients in that the damping device includes at least sectionally a porous damping structure. In this case, this type of a porous damping structure offers the advantage of a reduced susceptibility to cracking and thus an accompanying increased service life. Moreover, the gas present in the pores of the damping structure improves the damping effect of the damping device as compared to the compact damping materials and damping layers known from the prior art, whereby corresponding installation space savings are possible in the case of a predefined damping effect. Furthermore, the damping device according to the present invention has a reduced weight due to the porous damping structure. In the simplest embodiment of the present invention, the damping device is made exclusively of the damping structure and has no further components. In this case, the damping device or the porous damping structure may additionally also be used as a type of a labyrinth seal due to its surface structure which includes hollow spaces. Moreover, it is possible to manufacture the damping device according to the present invention at least partially generatively, whereby, in addition to the resulting cost savings, complex external and pore geometries are also easily implementable. The damping structure may basically be implemented to have predominantly or exclusively open pores or to have predominantly or exclusively closed pores.

In one advantageous embodiment of the present invention, it is provided that at least the porous damping structure is designed to be radially elastic and/or axially gas impermeable and/or gas permeable in the peripheral direction with regard to the rotation axis of the rotor. In other words, it is provided that the porous damping structure has a radial elasticity at least in the assembled state. In this way, the damping structure may be installed in a pre-tensioned state into the associated hollow space or in the associated cavity of the housing, whereby a particularly great damping and sealing effect is achievable even in the case of high temperature gradients. Moreover, any thermally and/or mechanically induced stresses may be reduced better with the aid of the radial elasticity, whereby the service life of the damping device may be additionally increased. Due to the fact that the damping structure is axially gas impermeable, a particularly great damping and sealing effect is achieved in the installed state of the damping device. If the damping structure is designed to be gas permeable in the peripheral direction, this means, in other words, that at least one gas channel is formed which extends, with regard to the installed state of the damping device, in the peripheral direction between an end of the damping structure on the gas inlet side and an end of the damping structure on the gas outlet side. It is thus possible to subject the damping structure in the peripheral direction to a cooling medium, thus additionally increasing its damping and insulating effect.

Further advantages result from the porous damping structure having geometrically regular and/or geometrically irregular and/or directed porous hollow spaces and/or hollow spaces having a meandering cross section and/or having a polygonal cross-section. With the aid of a geometrically regular and/or geometrically irregular implementation of the hollow spaces, on the one hand, the geometry of the hollow space to be filled and, on the other hand, the thermal and mechanical stresses which occur during operation of the associated gas turbine may be taken into account particularly well. A directed porosity allows for the targeted implementation of gas channels through the damping structure. As a result of implementing hollow spaces having meandering and/or polygonal cross-sections, it is possible to generate isotropic and/or anisotropic properties and/or gas permeabilities in a targeted manner. Moreover, the ratio of the wall material of the damping structure to the hollow space volume of the damping structure may be adjusted optimally to the particular application. A polygonal geometry is, in particular, to be understood to mean regular and/or irregular triangles, squares (e.g., cube-shaped, cuboid-shaped, rhombus-shaped, etc.), pentagons, hexagons, heptagons, octagons, etc.

Further advantages result if the porous damping structure is situated on a radially external area of the casing ring and/or is formed on the radially external area of the casing ring. In other words, it may be provided that the damping structure is situated on a radially external area of the casing ring or casing ring segment, which is also referred to as outer air seal (OAS), so that the radially external area of the casing ring delimits the damping structure and thus the damping device. In this case, it may be provided that the damping structure and the casing ring are, for example, integrally connected to one another. It is also possible that the damping structure is formed or manufactured directly on the radially external area of the casing ring. In this way, the casing ring and the damping device may be designed as one piece, thus providing for corresponding time and cost savings during assembly, since only one component must be mounted.

In another advantageous embodiment of the present invention, the porous damping structure is surrounded at least sectionally or completely by at least one sealing wall. With the aid of a sealing wall, which may basically be designed to be completely or partially rigid and/or elastic, a protection of the porous damping structure may be achieved against environmental influences, mechanical damage, undesirable gas exchange, and the like. Moreover, the at least one sealing wall may provide mounting areas for attaching the damping device to the housing. It may be provided that multiple areas of the damping structure are provided with a corresponding number of sealing walls which are independent from one another.

Further advantages result from the sealing wall having at least one through opening through which gas may enter the porous damping structure at least during operation of the thermal gas turbine and/or through which gas may exit from the porous damping structure. In this way, leakage paths through the damping device may be defined in a targeted manner, in order to achieve a restricting effect or to dissipate heat in a targeted manner, for example. The integration of this functionality into the damping device allows for saving corresponding components in the associated gas turbine, whereby, in addition to the weight and the installation space, the number of places in the housing to be sealed is advantageously reduced. Alternatively or additionally, the at least one through opening may also be used for subjecting the inner chamber of the damping device, which is delimited by the sealing wall(s) to pressure, so that the damping device may be "inflated" in the presence of certain pressure differences.

In another advantageous embodiment of the present invention, it is provided that at least one through opening is formed in a corresponding sealing wall in an area of the damping device which is axially anterior and/or axially posterior with regard to the rotation axis of the rotor. In this way, the pressure differences may be used optimally which occur during operation of the associated gas turbine between the end area, which lies upstream, viewed in the flow direction, and/or in the end area, which lies downstream, of the damping device.

In another advantageous embodiment of the present invention, it is provided that the damping device includes at least one spacer element on its side which is to face the housing wall of the gas turbine for the purpose of forming a flow path between the sealing element and the housing wall. This may also be used to advantageously define a leakage path for reducing and/or guiding leakage gases in a targeted manner. In the simplest embodiment, the at least one spacer element may be formed through the porous damping structure. Alternatively or additionally, the spacer element may be situated as an elevation, e.g., as a knob, on a sealing wall or be integrally formed therewith. Due to the fact that the damping device is implemented in a circular-segment shaped manner and/or in one piece with the casing ring, corresponding time and cost advantages may be achieved with regard to assembly, disassembly, and maintenance of the associated gas turbine.

Further advantages result if the damping device includes at least one stop for positioning the damping device in the hollow space and/or at least one receptacle in which at least one other component of the thermal gas turbine is situatable, and/or includes a flange for support against at least one other component of the thermal gas turbine. This provides further possibilities of simplifying and accelerating the assembly and disassembly of the damping device, whereby corresponding time and cost advantages are implemented.

One second aspect of the present invention relates to a method for manufacturing a damping device which is situatable between a housing wall of a housing of a thermal gas turbine and a casing ring, the casing ring having an area which is radially internal with regard to a rotation axis of a rotor of the thermal gas turbine and which faces the rotating moving blades of the gas turbine. In this case, it is provided according to the present invention that the damping device is manufactured at least sectionally to have a porous damping structure. It is possible in this way to manufacture a damping device which has a reliable damping effect even in the case of high temperature gradients. Further features and their advantages may be derived from the embodiments of the first aspect of the present invention; advantageous embodiments of the first aspect of the present invention are to be regarded as advantageous embodiments of the second aspect of the present invention and vice versa.

A particularly flexible and cost-effective manufacture is achieved in one advantageous embodiment of the present invention in that the damping device is manufactured at least sectionally generatively. The damping device may, for example, be manufactured completely or partially with the aid of stereolithography, selective laser melting, selective laser sintering, fused deposition modeling, laminated object modeling, or 3D printing as well as with the aid of combinations thereof. In particular, if the damping device or its damping structure is very complex geometrically, considerable time and cost savings are achieved in this way.

Here, it may furthermore be provided that the damping device is manufactured from different materials. For example, the damping structure and the sealing wall(s) may be made of different materials. Alternatively or additionally, it may be provided that the damping structure is manufactured from different materials in order to achieve an anisotropic behavior. It is understood that the materials used during operation of the associated gas turbine must be capable of withstanding the occurring maximum temperatures. Depending on the manufacturing process, alloys and ceramic materials are recommended which are, in particular, stable at high temperatures.

One third aspect of the present invention relates to a thermal gas turbine, in particular an aircraft engine, which has a housing in which a damping device is situated between a housing wall and a casing ring, the casing ring having an area which is radially internal with regard to the rotation axis of a rotor of the gas turbine and which faces the rotating moving blades of the gas turbine, and a radially external area which faces the damping device. In this case, it is provided according to the present invention that the damping device is designed according to the first aspect of the present invention and/or manufactured according to a method according to the second aspect of the present invention. It is possible in this way to provide the gas turbine with a damping device which has a reliable damping effect even in the case of high temperature gradients. Further features and their advantages may be derived from the embodiments of the first and the second aspects of the present invention; advantageous embodiments of the first and the second aspects of the present invention are to be regarded as advantageous embodiments of the third aspect of the present invention and vice versa.

Further advantages result if at least the porous damping structure of the damping device, which is situated between the housing wall and the casing ring, is pre-tensioned. In this way, it is advantageously ensured that the damping effect is reliably maintained even in the case of high temperature gradients, since the damping structure may carry out an automatic tolerance compensation due to its pretension. Depending on the concrete embodiment of the damping device, it may basically also be provided that the entire damping device is pre-tensioned.

Further features of the present invention result from the claims and the exemplary embodiment(s), as well as with reference to the drawing(s). The features and the feature combinations mentioned previously in the description, as well as the features and the feature combinations mentioned subsequently in the exemplary embodiment(s) are usable not only in the given combination, but also in other combinations or alone without departing from the scope of the present invention.

DETAILED DESCTIPTION

Figure 1:
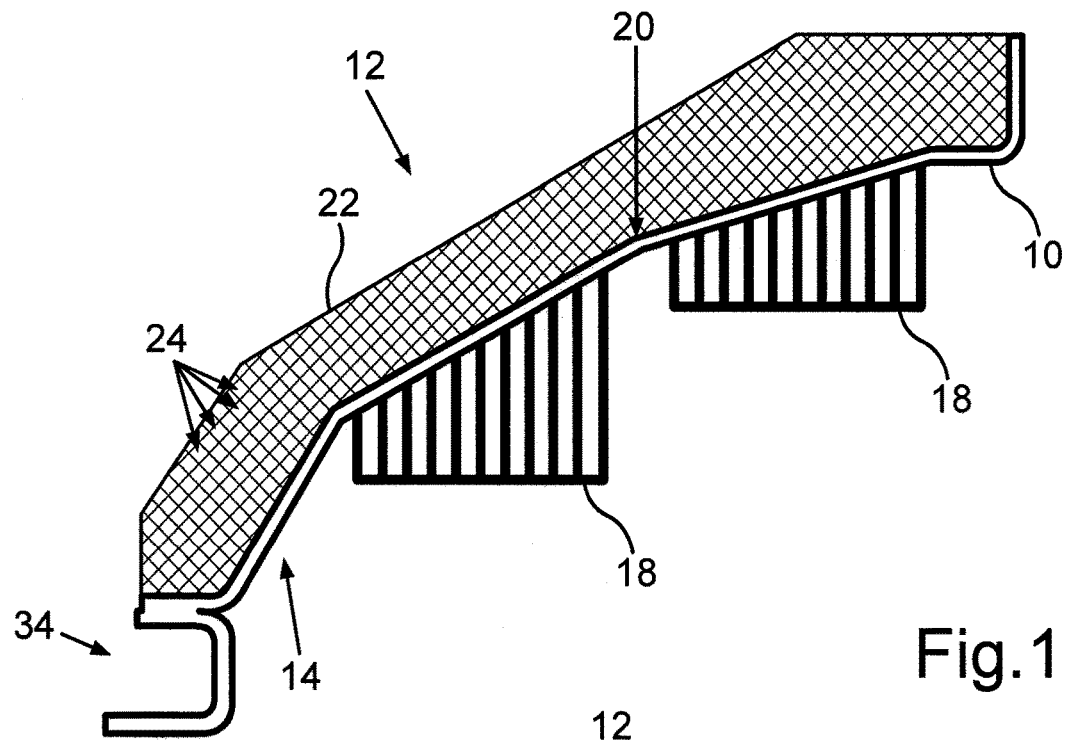
FIG. 1 shows a schematic, lateral sectional view of a casing ring on which a damping device according to the present invention is implemented.

FIG. 1 shows a schematic, lateral sectional view of a casing ring 10 of an aircraft engine on which a damping device 12 according to the present invention is implemented. Casing ring 10, which is segment-shaped in the present case, includes an area 14 which is radially internal with regard to a rotation axis of a rotor of the aircraft engine and which faces rotating moving blades 16 (see FIG. 7) of the aircraft engine. Sealing elements 18, e.g., honeycomb structures, which are known per se and into which moving blades 16 may engage, are situated in radially internal area 14. Furthermore, casing ring 10 includes a radially external area 20 on which, according to the exemplary embodiment shown, damping device 12 formed according to the present invention was generatively manufactured from a metal alloy which is stable at high temperatures, so that casing ring 10 and damping device 12 form one piece. In the exemplary embodiment shown, damping device 12 is made of a porous damping structure 22 having a plurality of hollow spaces 24, hollow spaces 24 each being designed to have rhombus-shaped cross sections. In this case, hollow spaces 24 have at least essentially the same cross-sectional area. Alternatively, it may be provided that some hollow spaces 24 may have a deviating, if necessary also irregular, geometry and/or a deviating cross-sectional area. Damping structure 22 is in this case designed in such a way that it is radially elastic, axially gas impermeable and gas permeable in the peripheral direction with regard to the rotation axis of the rotor. This will be elucidated in greater detail in conjunction with the following exemplary embodiment. Casing ring 10 furthermore provides a receptacle 34 in which other components of a thermal gas turbine are situatable in a housing 32 (see FIG. 7) of the gas turbine during the assembly of casing ring 10.

Figure 2:
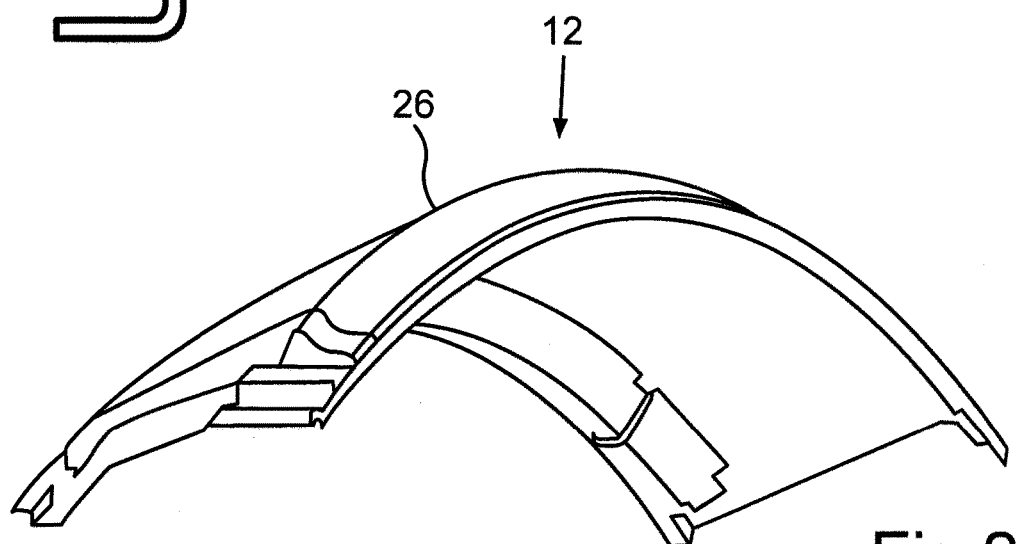
FIG. 2 shows a perspective view of a segment-shaped damping device according to another exemplary embodiment.
Figure 3:
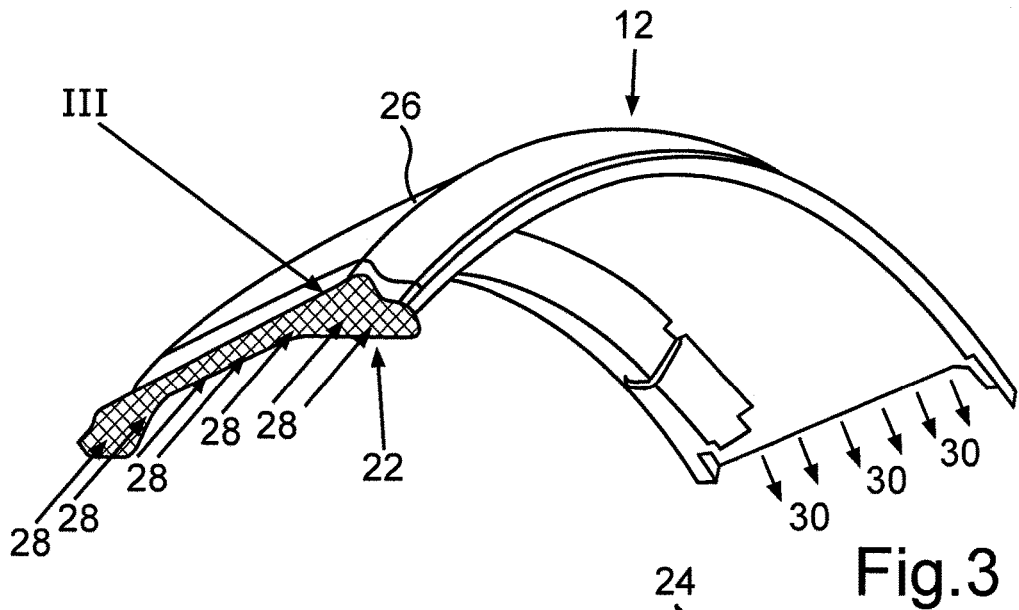
FIG. 3 shows a sectioned perspective view of the damping device illustrated in FIG. 2.
Figure 4:
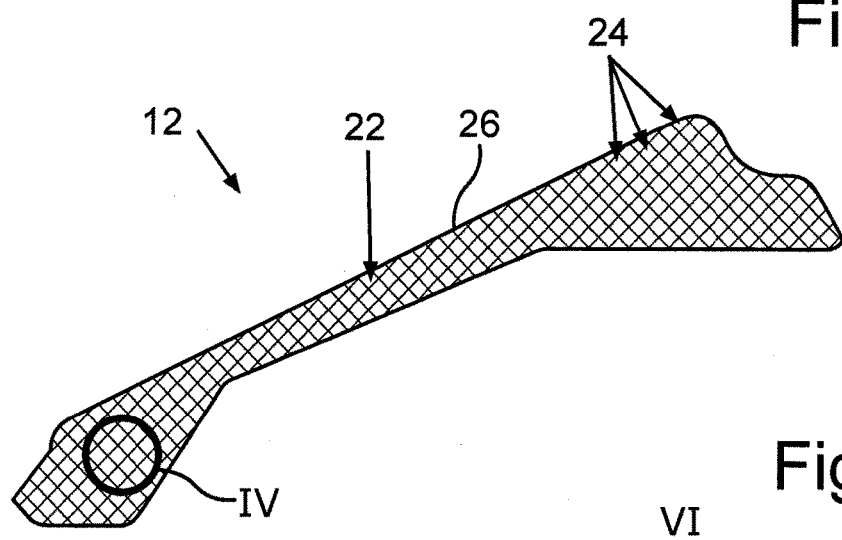
FIG. 4 shows a schematic view of section area III of the damping device illustrated in FIG. 3.
Figure 5:
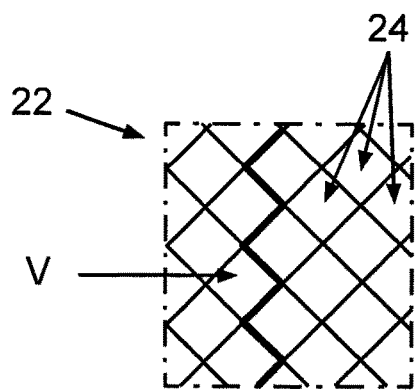
FIG. 5 shows an enlarged view of detail IV illustrated in FIG. 4.
Figure 6:
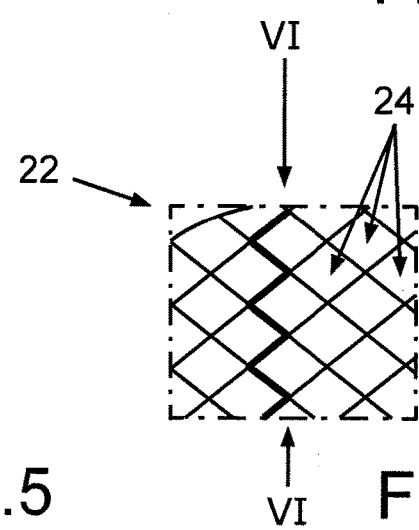
FIG. 6 shows an enlarged view of detail IV illustrated in FIG. 4, the damping structure being elastically pre-tensioned.

FIG. 2 shows a perspective view of a segment-shaped damping device 12 according to another exemplary embodiment and is explained in conjunction with FIG. 3 through FIG. 6. FIG. 3 shows a sectioned perspective view of damping device 12 shown in FIG. 2, while FIG. 4 shows a schematic view of section area III of damping device 12 shown in FIG. 3. FIG. 5 and FIG. 6 each show enlarged views of detail IV shown in FIG. 4, damping structure 22 of damping device 12 being illustrated in a radially relaxed state in FIG. 5 and in a radially elastically pre-tensioned state in FIG. 6. It is apparent in FIG. 2 that damping device 12 is not designed in one piece with a casing ring 10 in contrast to the first exemplary embodiment and moreover has a sealing wall 26 which entirely encases damping structure 22. Sealing wall 26 may generally be made of the same or of a deviating material as damping structure 22. Moreover, it may be provided that sealing wall 26 is not manufactured generatively, but, for example, by master forming, forming, separating and the like, while damping structure 22 is manufactured generatively. Alternatively, entire damping device 12 may be manufactured generatively or non-generatively.

As is apparent from FIG. 3, cooling air, which is symbolized by arrows 28, may enter damping structure 22 in the peripheral direction of circular-segment shaped damping device 12 and is channeled out at the opposite end area of damping structure 22 or channeled into an adjoining damping device 12 in the assembled state. This is symbolized with arrows 30. As is apparent in FIG. 4 and FIG. 5, the geometry of porous damping structure 22 ensures that damping structure 22 and thus damping device 12 are axially gas impermeable. This is indicated by arrow V in FIG. 5. As is apparent in FIG. 6, the geometry of porous damping structure 22, however, also ensures that damping structure 22 is elastically deformable in the radial direction according to arrows VI. It is possible in this way to pre-tension damping structure 22 or damping device 12 and to mount it in an associated housing 32 (see FIG. 7) in the pre-tensioned state, thus achieving a particularly great damping effect. For this purpose, it is advantageous if sealing wall 26, if present, is also designed to be partially elastic or deformable.

Figure 7:
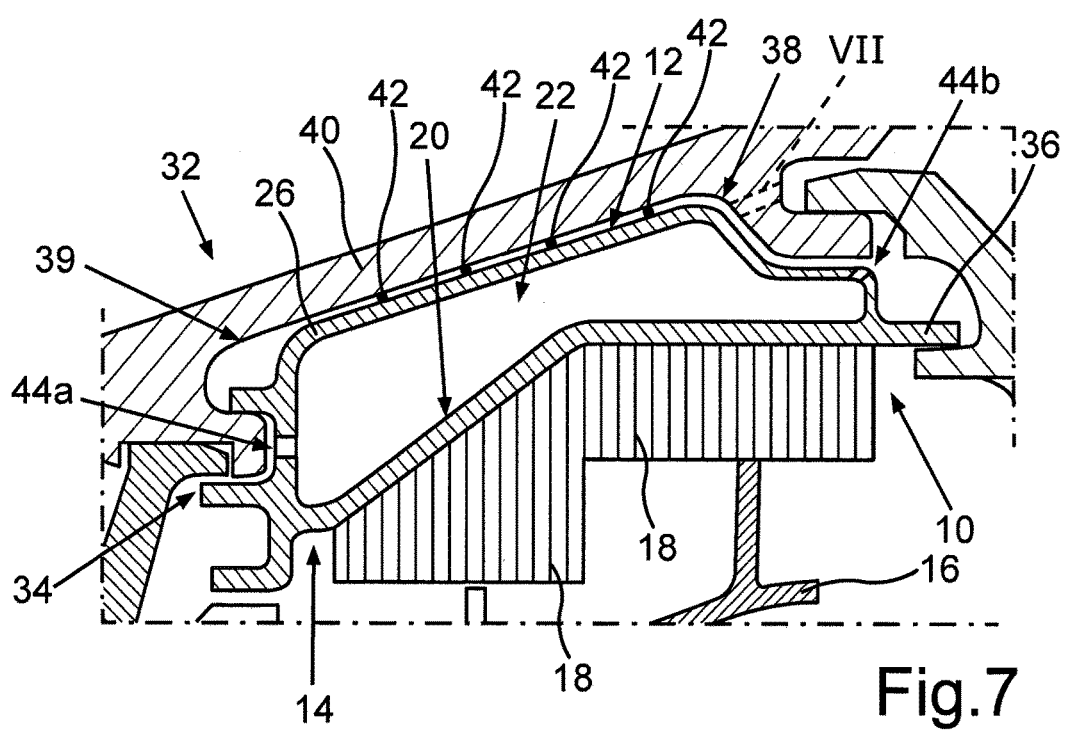
FIG. 7 shows a schematic, lateral sectional view of another exemplary embodiment of the damping device.

FIG. 7 shows a schematic, lateral sectional view of another exemplary embodiment of damping device 12, damping device 12 being illustrated in the assembled state in a housing 32 of an aircraft engine. Analogously to the first exemplary embodiment, damping device 12 is in this case designed in one piece with a segment-shaped casing ring 10. Radially external area 20 of casing ring 10 forms in this case the radially internal sealing wall area of damping device 12. Damping structure 22 which is enclosed by sealing wall 26 is not illustrated in greater detail for the sake of clarity. In the present case, damping structure 22 may, however, also basically have geometrically regular, geometrically irregular, opened porous, closed porous, directed porous, in cross section meander-shaped and/or in cross section polygonal hollow spaces 24. It is apparent that sealing wall 26 forms an accommodating receptacle 34 in which other components of the gas turbine are situated which are known per se. Furthermore, sealing wall 26 forms a flange 36 for support against at least one other component of the thermal gas turbine. The area denoted with reference numeral 38 in FIG. 7 is moreover used as an integral stop for positioning damping device 12 in associated cavity 39 of housing 32.

On one of its sides facing housing wall 40, damping device 12 has multiple knob-shaped spacer elements 42 for forming a defined flow path between damping device 12 and housing wall 40. In this way, it may be ensured that a minimum gas amount is always able to flow between damping device 12 and housing wall 40. In order to enable a pressure application to porous damping structure 22, through openings 44a, which may be implemented as bore holes, for example, are provided at the inlet side of sealing wall 26, viewed in the flow direction. In the end area of damping device 12 which is situated downstream viewed in the flow direction, one or multiple other through opening(s) 44b, which may be implemented as (a) restricting bore hole(s), for example, and channel gas into the desirable housing area, may be provided for the purpose of discharging gas and heat, as necessary. Reference numeral VII indicates a basically possible configuration of a gas discharging channel in housing wall 40. If this gas discharging channel is present, it may be provided that alternatively or additionally to the radially farther internally situated through openings 44b, one or multiple through openings (not shown) are formed in the area of this gas discharging channel in sealing wall 26. The indicated gas discharging channel may furthermore be used to discharge gas which flows between housing wall 40 and the radially upper sealing wall area with the aid of spacer element 42.

What is claimed is:

1. A damping device for being situated between a housing wall of a housing of a thermal gas turbine and a casing ring, the casing ring having an area radially internal with regard to a rotation axis of a rotor of the thermal gas turbine and facing rotating moving blades of the thermal gas turbine, the damping device comprising:
   at least sectionally a porous damping structure, the porous damping structure being radially elastic and gas permeable in a peripheral direction with respect to the rotation axis of the rotor, the porous damping structure being axially gas impermeable.

2. The damping device as recited in claim 1 wherein the porous damping structure has hollow spaces, the hollow spaces being at least one of geometrically regular, geometrically irregular, directed porous, in cross section meander-shaped and in cross section polygonal.

3. The damping device as recited in claim 1 wherein the porous damping structure is at least one of situated on a radially external area of the casing ring and is formed on the radially external area of the casing ring.

4. The damping device as recited in claim 1 further comprising at least one sealing wall surrounding at least sectionally or completely the porous damping structure.

5. The damping device as recited in claim 4 wherein the sealing wall has at least one through opening through which gas may enter the porous damping structure at least during operation of the thermal gas turbine and/or through which gas may exit the porous damping structure.

6. The damping device as recited in claim 5 wherein a first of the at least one through opening is formed in the sealing wall in an axially anterior area of the damping device and a second of the at least one through opening is formed in an axially posterior area of the damping device with regard to the rotation axis of the rotor.

7. The damping device as recited in claim 1 further comprising, on its side to be facing the housing wall of the gas turbine, at least one spacer element for forming a flow path between the damping device and the housing wall.

8. The damping device as recited in claim 1 wherein the damping device is at least one of circular-segment shaped and in one piece with the casing ring.

9. The damping device as recited in claim 1 further comprising at least one of:
   at least one stop for positioning the damping device in a cavity of the housing,
   at least one receptacle in which at least one other component of the thermal gas turbine is situatable, and
   a flange for support against at least one other component of the thermal gas turbine.

10. A thermal gas turbine comprising:
    the damping device as recited in claim 1;
    a casing ring,
    a housing in which the damping device is situated between a housing wall and a casing ring, the casing ring having an area radially internal with regard to the rotation axis of a rotor of the thermal gas turbine and facing rotating moving blades of the thermal gas turbine, the casing ring having a radially external area facing the damping device.

11. The thermal gas turbine as recited in claim 10 wherein at least the porous damping structure of the damping device, which is situated between the housing wall and the casing ring, is pre-tensioned.

12. The thermal gas turbine as recited in claim 10 wherein the thermal gas turbine is an aircraft engine.

13. A damping device for being situated between a housing wall of a housing of a thermal gas turbine and a casing ring, the casing ring having an area radially internal with regard to a rotation axis of a rotor of the thermal gas turbine and facing rotating moving blades of the thermal gas turbine, the damping device comprising:
    at least sectionally a porous damping structure;
    at least one sealing wall surrounding at least sectionally or completely the porous damping structure, wherein the sealing wall has at least two through openings through which gas may enter the porous damping structure at least during operation of the thermal gas turbine and through which gas may exit the porous damping structure, wherein a first of the at least two through openings is formed in the sealing wall in an axially anterior area of the damping device and a second of the at least two through opening is in an axially posterior area of the damping device, with respect to the rotation axis of the rotor; and
    on its side to be facing the housing wall of the gas turbine, at least one spacer element for forming a flow path between the damping device and the housing wall.

14. The damping device as recited in claim 13 wherein the porous damping structure has hollow spaces, the hollow spaces being at least one of geometrically regular, geometrically irregular, directed porous, in cross section meander-shaped and in cross section polygonal.

15. The damping device as recited in claim 13 wherein the damping device is at least one of circular-segment shaped and in one piece with the casing ring.

16. The damping device as recited in claim 13 further comprising at least one of:
    at least one stop for positioning the damping device in a cavity of the housing,
    at least one receptacle in which at least one other component of the thermal gas turbine is situatable, and
    a flange for support against at least one other component of the thermal gas turbine.

\* \* \* \* \*